US009944031B2

(12) United States Patent
Thompson et al.

(10) Patent No.: US 9,944,031 B2
(45) Date of Patent: Apr. 17, 2018

(54) MOLDED OPTICAL ARTICLES AND METHODS OF MAKING SAME

(75) Inventors: D. Scott Thompson, Woodbury, MN (US); Larry D. Boardman, Woodbury, MN (US); Fedja Kecman, St. Louis Park, MN (US); Catherine Leatherdale, Woodbury, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 849 days.

(21) Appl. No.: 12/018,298

(22) Filed: Jan. 23, 2008

(65) Prior Publication Data

US 2008/0193749 A1    Aug. 14, 2008

Related U.S. Application Data

(60) Provisional application No. 60/889,627, filed on Feb. 13, 2007.

(51) Int. Cl.
*B29D 11/00* (2006.01)
*G02B 1/04* (2006.01)

(52) U.S. Cl.
CPC .......... *B29D 11/0073* (2013.01); *G02B 1/041* (2013.01); *Y10T 428/28* (2015.01)

(58) Field of Classification Search
CPC .................................................... B29C 41/00
See application file for complete search history.

(56) References Cited

U.S. PATENT DOCUMENTS

| | | | |
|---|---|---|---|
| 3,159,662 A | 12/1964 | Ashby | |
| 3,220,972 A | 11/1965 | Lamoreaux | |
| 3,410,886 A | 11/1968 | Joy | |
| 4,510,094 A | 4/1985 | Drahnak | |
| 4,530,879 A | 7/1985 | Drahnak | |
| 4,585,669 A | 4/1986 | Eckberg | |
| 4,609,574 A | 9/1986 | Keryk et al. | |
| 4,632,899 A | 12/1986 | Takeda | |
| 4,670,531 A | 6/1987 | Eckberg | |
| 4,822,536 A | 4/1989 | Voinis | |
| 4,916,169 A | 4/1990 | Boardman et al. | |
| 5,145,886 A * | 9/1992 | Oxman .................... | A61K 6/10 522/66 |
| 5,169,727 A | 12/1992 | Boardman | |
| 5,248,716 A | 9/1993 | Lin et al. | |
| 5,300,263 A * | 4/1994 | Hoopman et al. ............. | 264/2.5 |
| 5,389,698 A | 2/1995 | Chigrinov | |
| 5,435,953 A | 7/1995 | Osada et al. | |
| 5,436,764 A | 7/1995 | Umetani et al. | |
| 5,496,961 A | 3/1996 | Dauth et al. | |
| 5,507,633 A | 4/1996 | Osada et al. | |
| 5,523,436 A | 6/1996 | Dauth et al. | |
| 5,548,038 A * | 8/1996 | Enami et al. ................. | 525/478 |
| 5,603,879 A | 2/1997 | Osada et al. | |
| 5,694,246 A * | 12/1997 | Aoyama et al. ............. | 359/619 |
| 5,753,538 A | 5/1998 | Kuno et al. | |
| 5,834,035 A | 11/1998 | Osada et al. | |
| 5,998,096 A | 12/1999 | Umemoto et al. | |
| 6,046,250 A | 4/2000 | Boardman et al. | |
| 6,066,861 A | 5/2000 | Hohn | |
| 6,150,546 A | 11/2000 | Butts | |
| 6,204,523 B1 | 3/2001 | Carey et al. | |
| 6,274,890 B1 * | 8/2001 | Oshio et al. .................... | 257/98 |
| 6,367,949 B1 * | 4/2002 | Pederson ...................... | 362/240 |
| 6,376,569 B1 | 4/2002 | Oxman et al. | |
| 6,399,734 B1 * | 6/2002 | Hodd et al. .................... | 528/32 |
| 6,432,137 B1 | 8/2002 | Nanushyan et al. | |
| 6,473,554 B1 | 10/2002 | Pelka et al. | |
| 6,598,998 B2 | 7/2003 | West et al. | |
| 6,617,401 B2 | 9/2003 | Rubinsztajn | |
| 6,623,667 B2 | 9/2003 | Lundin | |
| 6,650,044 B1 | 11/2003 | Lowery | |
| 6,679,621 B2 | 1/2004 | West et al. | |
| 6,682,331 B1 | 1/2004 | Peh et al. | |
| 6,770,685 B1 | 8/2004 | Chang | |
| 6,804,062 B2 | 10/2004 | Atwater et al. | |
| 6,806,509 B2 | 10/2004 | Yoshino et al. | |
| 6,815,520 B2 | 11/2004 | Yoneda et al. | |
| 6,908,682 B2 | 6/2005 | Mustele | |

(Continued)

FOREIGN PATENT DOCUMENTS

| | | |
|---|---|---|
| CN | 1074923 A | 8/1993 |
| CN | 1682376 A | 10/2005 |

(Continued)

OTHER PUBLICATIONS

Definition of term "mold" from dictionary.com, retrived on Mar. 11, 2014.*
Bruce Irving, "The Science and Engineering Behind Optics-Light and Lenses", Optics for Kids, Sep. 10, 2015.*
Definition "lens" from Dictionary.com, retrived on Dec. 12, 2016.*
Choi et al., "Flourinated Organic—Inorganic Hybrid Mold as a new Stamp for Nanoimprint and Soft Lithography", Langmuir vol. 21, pp. 9390-9392, 2005.
Supplementary European Search Report; EP Application No. 08 71 4157.8; PCT/US2008/052742; dated Jun. 11, 2010.
EP Search Report dated Jul. 19, 2011 from EP Application No. 08729730.5, 8 pages.
File History for U.S. Appl. No. 11/855,524, 133 pages.

*Primary Examiner* — Anish Desai
(74) *Attorney, Agent, or Firm* — Clifton F. Richardson (57) ABSTRACT

Molded optical articles and methods of making them are disclosed herein. Optical articles comprise a photopolymerizable composition disposed on a major surface of a substrate. The photopolymerizable composition comprises: a silicon-containing resin comprising silicon-bonded hydrogen and aliphatic unsaturation, and a platinum catalyst providing from about 0.5 to about 30 parts per million of platinum. The major surface imparts a positive or negative lens to the photopolymerizable composition. Optical articles also include those that have been photopolymerized using actinic radiation having a wavelength of 700 nm or less.

10 Claims, 5 Drawing Sheets

(56) References Cited

U.S. PATENT DOCUMENTS

| | | | |
|---|---|---|---|
| 6,921,929 B2 | 7/2005 | LeBoeuf et al. | |
| 7,144,528 B2 | 12/2006 | Altmann | |
| 7,192,795 B2 | 3/2007 | Boardman | |
| 7,202,320 B2 | 4/2007 | George et al. | |
| 7,245,435 B2 | 7/2007 | Morishita et al. | |
| 7,255,920 B2 | 8/2007 | Everaerts et al. | |
| 7,256,428 B2 | 8/2007 | Braune et al. | |
| 7,294,861 B2 * | 11/2007 | Schardt | H01L 33/507 257/81 |
| 7,314,770 B2 | 1/2008 | Boardman et al. | |
| 7,351,951 B2 | 4/2008 | Arendonk | |
| 7,482,633 B2 | 1/2009 | Chiaretti | |
| 7,566,756 B2 * | 7/2009 | Kashiwagi | C08L 83/04 525/478 |
| 7,595,113 B2 * | 9/2009 | Miyoshi | 428/447 |
| 7,655,486 B2 | 2/2010 | Thompson et al. | |
| 7,932,970 B2 | 4/2011 | Kim | |
| 2001/0042865 A1 | 11/2001 | Oshio | |
| 2002/0028527 A1 | 3/2002 | Maeda et al. | |
| 2002/0105266 A1 | 8/2002 | Juestel | |
| 2003/0107316 A1 * | 6/2003 | Murakami et al. | 313/512 |
| 2003/0115907 A1 | 6/2003 | Patton et al. | |
| 2003/0199603 A1 | 10/2003 | Walker et al. | |
| 2004/0079114 A1 | 4/2004 | Aitken et al. | |
| 2004/0084681 A1 * | 5/2004 | Roberts | 257/79 |
| 2004/0116640 A1 | 6/2004 | Miyoshi | |
| 2004/0150991 A1 * | 8/2004 | Ouderkirk | H01L 33/46 362/231 |
| 2004/0173808 A1 * | 9/2004 | Wu | 257/99 |
| 2004/0202879 A1 | 10/2004 | Xia et al. | |
| 2005/0006659 A1 * | 1/2005 | Ng | H01L 33/505 257/99 |
| 2005/0076376 A1 | 4/2005 | Lind | |
| 2005/0162733 A1 | 7/2005 | Cho et al. | |
| 2005/0212008 A1 * | 9/2005 | Miyoshi | 257/100 |
| 2005/0218421 A1 | 10/2005 | Andrews et al. | |
| 2005/0244649 A1 | 11/2005 | Kashiwagi et al. | |
| 2006/0027828 A1 | 2/2006 | Kikuchi | |
| 2006/0091798 A1 | 5/2006 | Ouderkirk et al. | |
| 2006/0100299 A1 * | 5/2006 | Malik et al. | 522/31 |
| 2006/0102914 A1 | 5/2006 | Smits et al. | |
| 2006/0105480 A1 | 5/2006 | Boardman | |
| 2006/0105481 A1 * | 5/2006 | Boardman | C08L 83/04 438/22 |
| 2006/0138437 A1 * | 6/2006 | Huang et al. | 257/98 |
| 2006/0138443 A1 | 6/2006 | Fan et al. | |
| 2006/0142722 A1 | 6/2006 | Koenig et al. | |
| 2006/0262817 A1 | 11/2006 | Yu et al. | |
| 2006/0264583 A1 * | 11/2006 | Kashiwagi et al. | 525/478 |
| 2007/0001178 A1 | 1/2007 | Tran et al. | |
| 2007/0001182 A1 | 1/2007 | Schardt et al. | |
| 2007/0004065 A1 * | 1/2007 | Schardt | H01L 33/507 438/26 |
| 2007/0029569 A1 | 2/2007 | Andrews | |
| 2007/0092636 A1 | 4/2007 | Thompson et al. | |
| 2007/0092736 A1 | 4/2007 | Boardman et al. | |
| 2007/0112147 A1 | 5/2007 | Morita et al. | |
| 2007/0134425 A1 | 6/2007 | Morita et al. | |
| 2007/0244214 A1 | 10/2007 | Yoshitake et al. | |
| 2008/0044934 A1 | 2/2008 | Loh et al. | |
| 2009/0076184 A1 * | 3/2009 | Thompson | C08F 2/46 522/172 |
| 2009/0190211 A1 | 7/2009 | Kodama et al. | |

FOREIGN PATENT DOCUMENTS

| | | |
|---|---|---|
| EP | 1198016 A2 | 4/2002 |
| EP | 1 653 523 | 5/2006 |
| JP | 10-158349 | 6/1998 |
| JP | 2000-019356 | 1/2000 |
| JP | 2000-19356 | 1/2000 |
| JP | 2000-269555 | 9/2000 |
| JP | 2002-319709 | 10/2002 |
| JP | 2005-248122 | 9/2005 |
| JP | 2006007765 | 1/2006 |
| JP | 2006-49524 | 2/2006 |
| JP | 2006-137895 | 6/2006 |
| JP | 2007031213 | 2/2007 |
| JP | 2008-521252 | 6/2008 |
| KR | 2006-0104432 | 9/2006 |
| KR | 10-2006-0104432 | 10/2006 |
| WO | WO 95/025735 | 9/1995 |
| WO | WO 03/069015 | 8/2003 |
| WO | WO 2004/054773 | 7/2004 |
| WO | WO 2005/076376 A2 | 8/2005 |
| WO | WO 2005/121641 | 12/2005 |
| WO | WO 2006/013066 | 2/2006 |
| WO | WO 2006/055456 | 5/2006 |
| WO | WO 2006/064996 | 6/2006 |
| WO | WO 2007/024069 | 3/2007 |
| WO | WO 2007-050484 | 5/2007 |

\* cited by examiner

# MOLDED OPTICAL ARTICLES AND METHODS OF MAKING SAME

CROSS REFERENCE TO RELATED APPLICATION

This application claims the benefit of U.S. Provisional Patent Application No. 60/889627, filed Feb. 13, 2007.

FIELD OF THE INVENTION

The invention relates to optical articles, particularly lenses and waveguides, which are made using a silicon-containing resin.

BACKGROUND

Optical articles can be used in a variety of applications. Examples include lenses and light directing optics for solar concentrators and light emitting devices such as light emitting diodes (LEDs). Other examples include light transmitting and directing optical articles such as waveguides used in edgelit backlight assemblies and optical sensors.

SUMMARY

Molded optical articles and methods of making the same are disclosed herein. In one aspect, an optical article is disclosed herein, the optical article comprising: a photopolymerizable composition disposed in a cavity of a mold, the mold shaped to impart a positive or negative lens to the photopolymerizable composition, wherein the photopolymerizable composition comprises: a silicon-containing resin comprising silicon-bonded hydrogen and aliphatic unsaturation, and a platinum catalyst providing from about 0.5 to about 30 parts per million of platinum. In one embodiment, the positive or negative lens is a Fresnel lens. In another embodiment, the optical article further comprises a curable adhesive-forming composition disposed on the photopolymerizable composition.

In another aspect, a method of making an optical article is disclosed herein, the method comprising: providing a photopolymerizable composition disposed in a cavity of a mold, the mold shaped to impart a positive or negative lens to the photopolymerizable composition, wherein the photopolymerizable composition comprises: a silicon-containing resin comprising silicon-bonded hydrogen and aliphatic unsaturation, and a platinum catalyst providing from about 0.5 to about 30 parts per million of platinum; and photopolymerizing the photopolymerizable composition to form a photopolymerized composition, wherein photopolymerizing comprises applying actinic radiation having a wavelength of 700 nm or less.

In another aspect, optical articles formed by the methods disclosed herein are also described.

BRIEF DESCRIPTION OF DRAWINGS

The invention may be more completely understood in consideration of the following detailed description in connection with the Figures described above. The Figures are illustrative examples only.

DETAILED DESCRIPTION

Lenses are typically formed from plastics such as acrylic, polycarbonate, and cycloolefin copolymers. Such injection moldable plastics have refractive indices significantly higher than those of the most photostable silicone materials used for optical applications such as encapsulation in LED devices (the refractive index of polydimethylsiloxane is approximately 1.4). In addition, such resins are not as photostable and thermally stable as photothermally stable silicone materials. For example, when used for encapsulation of LED devices, the device stability must be traded against optical efficiency. Because of this, new silicone materials have been developed to mold silicone lenses to improve the photothermal stability of the lens material, which may improve performance of the devices. These thermally cured silicone resin materials, however, also have undesirable characteristics. Optical quality silicone resins that are based on a condensation cure mechanism suffer from very large material shrinkage and generally release one or more volatile byproducts. Optical quality silicones resins that are based on a metal catalyzed (typically metallic platinum or Pt(0) complexes) thermal hydrosilylation cure mechanism help to limit the cure shrinkage associated with condensation cured silicones, but they also require high temperatures to cure the material, because the silicone resin must be highly inhibited to provide a long enough pot life or working time to use the materials in a high temperature molding process. Because of the inhibitors that must be used with the thermally cured silicones, long cycle times are required to fully cure the materials. In addition, the necessary use of high temperatures leads to optical articles, which have increased internal stress, because the temperatures required to mold the silicone material are typically much higher than the temperatures that the optical article will experience in use.

The optical articles and methods disclosed herein may provide silicon-containing, including silicone, optical articles that can be made using short mold cycle times. The optical articles and methods include the use of one silicon-containing resin comprising silicon-bonded hydrogen and aliphatic unsaturation, where the resin comprises at least a metal-containing catalyst that is activated by actinic radiation. Additionally, the molding processes may allow for low temperatures to be used to reduce internal stress that is developed in the silicone resins.

The optical articles disclosed herein may further be used for producing LED devices where the optical articles provide a desired optical output or emission distribution of light. The optical article may constitute the outer layer of the LED device and may provide surface protection and in certain cases may alleviate dust pick up issues common to current commercial silicone encapsulants. It may be desirable for an inner encapsulant layer to be an organosiloxane-containing gel or soft elastomer. The resin used to make the optical article may be selected to be a hard, tough, and/or mechanically robust organosiloxane-containing material. The optical article can also comprise other silicon-containing, mechanically robust non-organosiloxane materials that exhibit excellent photothermal stability. Organosiloxane materials suitable for molding optical articles in this application have been described in U.S. Pat. No. 7,192,795, and the materials must contain at least one metal catalyst that can be activated by actinic radiation, for example, UV radiation with wavelengths between 250 nm and 500 nm. Additionally, the refractive index of the optical article can be selected to be less than that of the inner encapsulant layer. Finally, methods are described which can be used to make optical articles having a variety of shapes and sizes that can be used in a variety of applications, such as waveguides in sensors, waveguides for backlights, and concentrating optical articles, such as Fresnel lens arrays commonly used for photovoltaic applications.

For the purposes of describing the processes for molding optical articles, molds having cavities shaped for making hemispherical lenses are shown in the figures described herein. This is in no way is meant to limit the choice of shape or design of the optical articles which can be molded using the processes described herein.

Figure 1:
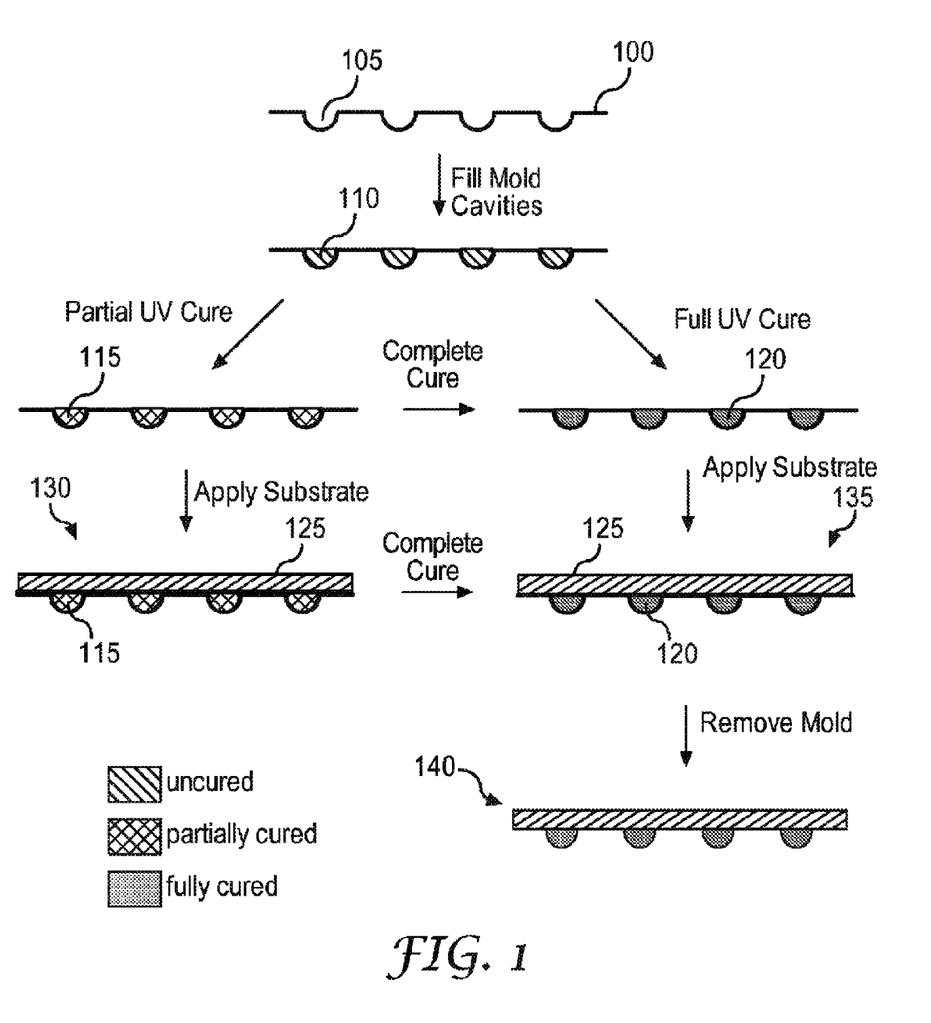
FIG. 1 is a schematic illustration of an exemplary method for making molded optical articles.

FIG. 1 is an illustration showing an exemplary method for making molded optical articles. Mold 100 with cavities 105 comprises a sheet or film based mold, which may be formed by a method such as injection molding, thermoforming, or vacuum forming of a plastic sheet or film. The mold is sometimes referred to as a first substrate. The mold can be made from a variety of materials and may or may not be transparent to actinic radiation, particularly UV radiation, which may be used for initiating reaction in the polymerizable composition, also referred to as lens resin or resin. The choice of mold material and design may determine which embodiments are possible.

Suitable mold materials may have glass transition temperatures greater than the temperatures used for the process. Examples of mold materials include polymeric materials such as fluoroelastomers, polyolefins, polystyrene, polyesters, polyurethanes, polyethers, polycarbonates, polymethyl methacrylate; and inorganic materials comprising ceramics, quartz, sapphire, metals, and certain glasses. Even organic-inorganic hybrid materials may be used as the mold; exemplary hybrid materials include fluorinated materials described by Choi et al. in *Langmuir*, Vol. 21, page 9390 (2005). The mold may be transparent such as a transparent ceramic; a transparent mold would be useful in cases where the actinic radiation is applied through the mold. The mold can also be non-transparent such as an opaque ceramic, an opaque plastic, or a metal. The mold can be fabricated by conventional machining, diamond turning, contact lithography, projection lithography, interference lithography, etching, or any other suitable technique. The mold may be an original master mold or a daughter mold thereof. Molding may be referred to as reactive embossing.

Transparent mold materials include, but are not limited to, fluorinated film molds such as those fabricated from thin Teflon, tetrafluoroethylene hexafluoropropylene vinylidene difluoride terpolymer (THV) from 3M Company and non-fluorinated materials such as polycarbonate, polyethylene terephthalate (PET), polypropylene, and the like. Non-transparent mold materials include thin metal sheet and opaque and/or colored plastics. These plastic molds can be made of thin sheet-like materials with formed cavities; such as can be produced in a thermoforming or vacuum molding process. Molds can also be made by precision machining processes, by cast and cure processes using a master tool or mold, or extrusion replication processes.

To mold 100 with cavities 105 is added uncured silicon-containing lens resin 110. Ideally the lens resin material is filled into the cavity until it is flush with the surface of the mold. If the lens resin is not filled high enough in the cavity, it may be difficult to contact the partially cured lenses 115 and cured lenses 120 to substrate 125. This is particularly problematic when the substrate is a rigid material such a glass. The lens resin once in the mold is irradiated with actinic radiation to produce an at least partially cured lens resin 115. To the mold with the partially cured lens resin 115 is applied substrate 125.

The substrate, sometimes referred to as a second substrate, may be PET, polycarbonate, polyethylene, a premask material such as coextruded polyethylene polyvinylacetate films, which cling to flat surfaces and provide a protective function and can be a carrier for the lenses, glass, or any other substrate of interest to give the assembly 130. The substrate may also be transparent. In some embodiments, the substrate comprises a pressure sensitive adhesive (PSA) as described below for FIGS. 2a-2c.

The partially cured lens resin 115 can be converted to give cured lens resin 120 with the application of heat or by storage at room temperature. Applying the substrate 125 to the partially cured lens resin material 115 may allow for the lens resin to build better adhesion to the substrate. Partially curing the lens resin with actinic radiation followed by the application of heat may be the preferred method for rapidly producing cured lens resin 120, when only low intensity light sources are available and rapid manufacturing is required. The uncured lens resin 110 can also be converted to cured lens resin 120 directly using either high intensity UV radiation or a simultaneous combination of radiation and heat. If converted directly to cured lens resin 120, the substrate applied to the cured lens resin 120 in the mold must have an affinity for either the mold 100, the cured lens resin 120, or both to make assembly 135.

The mold 100 can optionally be removed from the mold assembly 135 to give another assembly 140 comprising an array of lenses on the substrate. The mold 100 may also be removed before the lens resin is fully cured, provided it is not tacky and is mechanically robust enough to not be damaged as the mold is removed. In most cases it will be preferable to leave the mold in place until the lens resin is fully cured. The lenses on substrate 125, shown in assembly 140, can be removed and used individually if not aggressively adhered to the substrate or if the substrate has release characteristics.

Figure 2A:
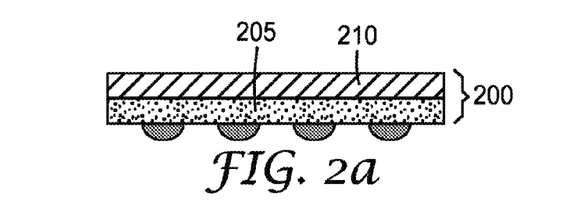
FIGS. 2a and 2b are schematic cross sections of exemplary assemblies of optical articles.
Figure 2B:
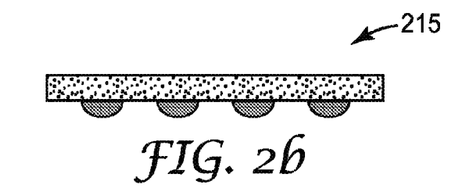
Figure 2C:
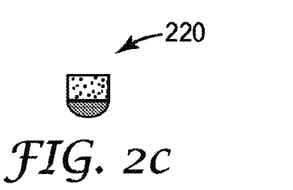
FIGS. 2c and 3 are schematic cross sections of exemplary optical articles.

Another embodiment is shown in FIG. 2a in which substrate 200 comprises PSA 205 disposed on support 210. The PSA is in contact with the lens resin. In some cases, the support may comprise a release liner which can be removed to give an assembly 215, as shown in FIG. 2b, which comprises an array of optical articles disposed on a layer of the PSA. As shown in FIG. 2c, a lens with PSA 220 can be made by kiss cutting or die cutting around a lens with PSA from assembly 215. Also, assembly 215 can be applied to another substrate before or after the mold is removed from the assembly.

The method described above may further comprise: forming a curable adhesive-forming composition disposed on the photopolymerizable composition; photopolymerizing the photopolymerizable composition to form a photopolymerized composition, wherein photopolymerizing comprises applying actinic radiation having a wavelength of 700 nm or less; and polymerizing the curable adhesive-forming composition to form a pressure sensitive adhesive.

Suitable PSAs include (meth)acrylate-based PSAs formed from free-radically polymerizable monomers selected from the group of (meth)acrylates, vinyl monomers, and mixtures thereof. As used herein, (meth)acrylate refers to both acrylates and methacrylates. Examples of (meth)acrylates include alkyl esters of (meth)acrylic acid wherein the alkyl group has from 1 to 20 carbon atoms, for example, ethyl acrylate, isobornyl methacrylate, and lauryl methacrylate; aromatic esters of (meth)acrylic acid such as benzyl methacrylate; and hydroxyalkyl esters of (meth)acrylic acid such as hydroxy ethyl acrylate. Examples of vinyl monomers include vinyl esters such as vinyl acetate, styrene and derivatives thereof, vinyl halides, vinyl propionates, and mixtures thereof. Further examples of monomers suitable for making the (meth)acrylate based PSAs are described in US 2004/202879 A1 (Xia et al.) which also describes methods for polymerizing the monomers. If desired, the PSA may be crosslinked as Xia et al. describes.

In some embodiments, the substrate is a PSA formed from a (meth)acrylate block copolymer as described in U.S. Pat. No. 7,255,920 B2 (Everaerts et al.). In general, these (meth)acrylate block copolymers comprise: at least two A block polymeric units that are the reaction product of a first monomer composition comprising an alkyl methacrylate, an aralkyl methacrylate, an aryl methacrylate, or a combination thereof, each A block having a Tg of at least 50° C., the methacrylate block copolymer comprising from 20 to 50 weight percent A block; and at least one B block polymeric unit that is the reaction product of a second monomer composition comprising an alkyl(meth)acrylate, a heteroalkyl(meth)acrylate, a vinyl ester, or a combination thereof, the B block having a Tg no greater than 20° C., the (meth)acrylate block copolymer comprising from 50 to 80 weight percent B block; wherein the A block polymeric units are present as nanodomains having an average size less than about 150 nm in a matrix of the B block polymeric units.

In some embodiments, the substrate is a silicone-based PSA. Examples of silicone-based PSAs are those that comprise a high molecular weight silicone gum and a silicate MQ resin, the MQ resin usually present at a level of 50-60% by weight with respect to solids. Other examples of silicone-based PSAs are described in U.S. Pat. No. 5,169,727 (Boardman). In general, these PSAs are photocurable and are formed from a composition comprising a flowable mixture of (a) a benzene soluble, resinous copolymer having triorganosiloxy and $SiO_{4/2}$ units, (b) a diorganoalkenylsiloxy endblocked polydiorganosiloxane, (c) a diorganohydrogensiloxy endblocked polydiorganosiloxane, (d) an organosilicon crosslinking agent being selected from organosilicon compounds having from 1 to 15 silicon atoms, and (e) a hydrosilation catalyst in an amount sufficient to effect curing of the composition. The silicone-based PSA may also comprise hydrosilylation inhibitors, photosensitizers, fillers, etc.

The proper choice of PSA may be determined by the application in which the optical article is to be used. The PSA should be chosen such that it strongly adheres the optical article to the substrate to which it is applied, for example, a hemispherical lens bonded to the surface of the encapsulant of a surface mount light emitting diode package or a Fresnel lens to a glass plate. Ideally, the PSA does not lose adhesion over time and is stable under the conditions of use. Ideal PSAs do not detract from the optical function of the optical article due to degradation of adhesion or degradation of the PSA material itself due to a lack of photo- and/or thermal stability.

Figure 3:
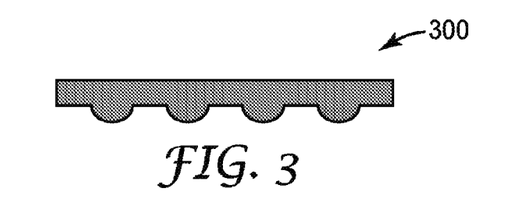

Mold 100 may be designed to create a layer of lenses, i.e., lenses with a flat film of cured resin of controlled thickness in the flat areas between lenses. Such a layer of lenses is shown in FIG. 3. This layer of lenses may comprise lenses small enough for use with light emitting diodes. This layer of lenses may be much larger having larger lenses, for example, the layer of lenses may comprise a layer of Fresnel lenses such that the layer can be used as a solar concentrator for photovoltaic cells. For such applications, where the optical articles are large (Fresnel lenses for photovoltaic cells can have sizes on the order of 1 square foot per lens and the lenses may be tiled in the x,y plane), the fast, low temperature curing enabled by the photocurable silicon-containing materials, specifically silicone materials described below, may be important to faithfully reproduce the features of the mold and improve manufacturing efficiency. A rigid substrate, such a glass plate, may be used as a substrate to which the layer of lenses is attached in order to provide dimensional stability. For applications where the optical articles are to be attached to non-planar surfaces a flexible substrate may be preferred.

Figure 4A:
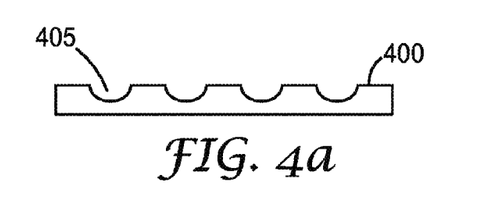
FIGS. 4a, 4b and 5a-5c are schematic cross sections of exemplary molds used to make molded optical articles.

FIG. 4a shows an exemplary mold that may be used in the method disclosed herein. Mold 400 comprises first cavity 405. The mold may be a solid block of material and may or may not be transparent to the actinic radiation necessary to initiate reaction in the silicon-containing lens resin. Suitable mold materials may have glass transition temperatures greater than the temperatures used for the process. Such mold materials are described above. Transparent mold materials include, but are not limited to, acrylic, polycarbonate, polypropylene, and other transparent polymeric materials. Non-transparent mold materials include steel, other metals (preferably ones capable of taking a high quality polish), ceramics, and opaque and/or colored plastics.

Figure 4B:
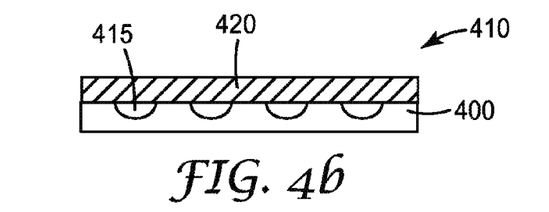

FIG. 4b shows exemplary mold assembly 410 that may be used. Mold assembly 410 comprises second cavity 415 which is formed by mold 400 and substrate 420. In this embodiment, either or both of the mold and substrate are transparent to the actinic radiation, particularly UV radiation, which is used for initiating reaction in the uncured lens resin. Uncured silicon-containing lens resin may be added to cavities 405 of mold 400. Substrate 420 can then be applied to form the second cavity which in this case is filled or partially filled with resin. The substrate may comprise acrylic, polycarbonate, polyethylene, glass, etc. The lens resin in the mold is then irradiated with actinic radiation through either or both of the mold and substrate, depending on whether the mold and/or substrate are transparent, to produce an at least partially cured lens resin. The uncured lens resin in the assembly can be converted to cured lens resin with the application of heat or by storage at room temperature. The uncured lens resin can be converted to a fully cured lens resin directly using either high intensity UV irradiation or a simultaneous combination of low intensity radiation and heat.

Mold 400 may optionally be removed from the assembly to give an array of lenses on a substrate. If partially cured lens resin in mold assembly is cured to a point of being tack free on the surfaces of the lenses, which are in contact with the mold, the mold can be removed prior to the heating step. Heating of the assembly produces an array of cured lenses on a substrate. This process can be used in a compression molding type process where the mold features are slightly over filled and the substrate, if rigid and strong, can be contacted to the mold with high pressure to force the lens resin into the mold, the excess resin being squeezed out of the mold cavities. Excess resin ends up as a thin film between the flat mold surface and substrate. This thin film on the flat mold surfaces, between mold cavity features, is typically referred to as flash.

For all of the processes using molds such as the ones shown in FIGS. 4a and 4b, thin plastic sheet inserts that are fitted to the molds can be used in the mold assemblies to make the various mold assemblies. Such mold inserts with improved release properties can be used with molds where the optical articles prove difficult to remove from the mold material.

Another embodiment of the method disclosed herein comprises transfer molding or low pressure liquid injection molding processes. In order to perform these types of molding processes the mold materials are solid blocks of material and at least part of the mold assembly must be transparent to the actinic radiation necessary to initiate reaction in the silicon-containing lens resin. Suitable mold materials will have glass transition temperatures greater than the temperatures used for the process. Such mold materials are described in above. Transparent mold materials include, but are not limited to, acrylic, polycarbonate, glass and other transparent polymeric materials. The traditional mold material for these types of processes is polished steel.

For this embodiment, the mold halves are assembled prior to filling the mold with the photocurable silicon-containing resin. In order to fill the mold cavities, the molds must have a system of channels, known as a sprue and runner system. The silicon-containing resin runs through the channels and into the mold cavities typically under pressure. In order to cure the resin at least one of the halves must be transparent to the actinic radiation necessary to initiate reaction in the silicon-containing resin. This is most often UV radiation with wavelengths between 250 nm and 450 nm. To achieve fast mold cycle times the resin may be exposed through the transparent mold to high intensity radiation with optional heating or be exposed to low intensity radiation with the mold heated to elevated temperatures. Once the resin is cured, the mold is opened to give hemispherical lenses.

Figure 5A:
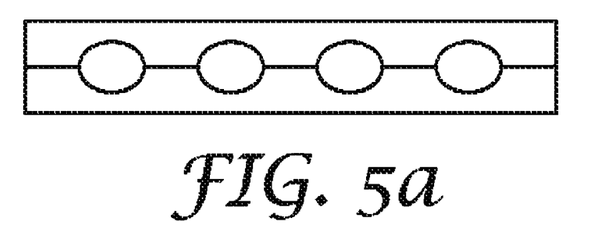
Figure 5B:
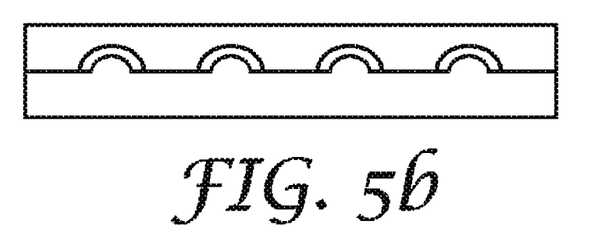
Figure 5C:
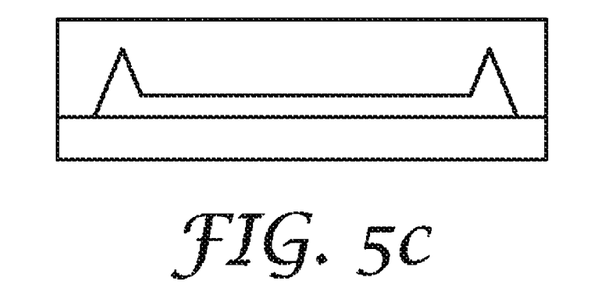

FIGS. 5a and 5b illustrate embodiments where the both sides of the mold have structure to create other shapes. FIG. 5a shows two mold halves, each having cavities, which are assembled to form a single cavity. Such design, for example, can be used for making optical articles such as aspheric lenses. FIG. 5b shows one side of the mold having a cavity and the other mold half having a protrusion. This type of mold design is used for making structures such as hollow lenses. FIG. 5c illustrates a different type of optical article that can be made. The optical article can be used as waveguide to transmit infrared light in a sensor device from an IR LED to a photodiode detector. The optical articles shown in the figures are illustrative and are not meant to limit the types of, shapes of, and size of optical articles that can be made using the molding processes described herein. The mold processes can be used to produce optical articles that range in size and can have micron size features, macroscopic features and combinations thereof.

Figure 6:
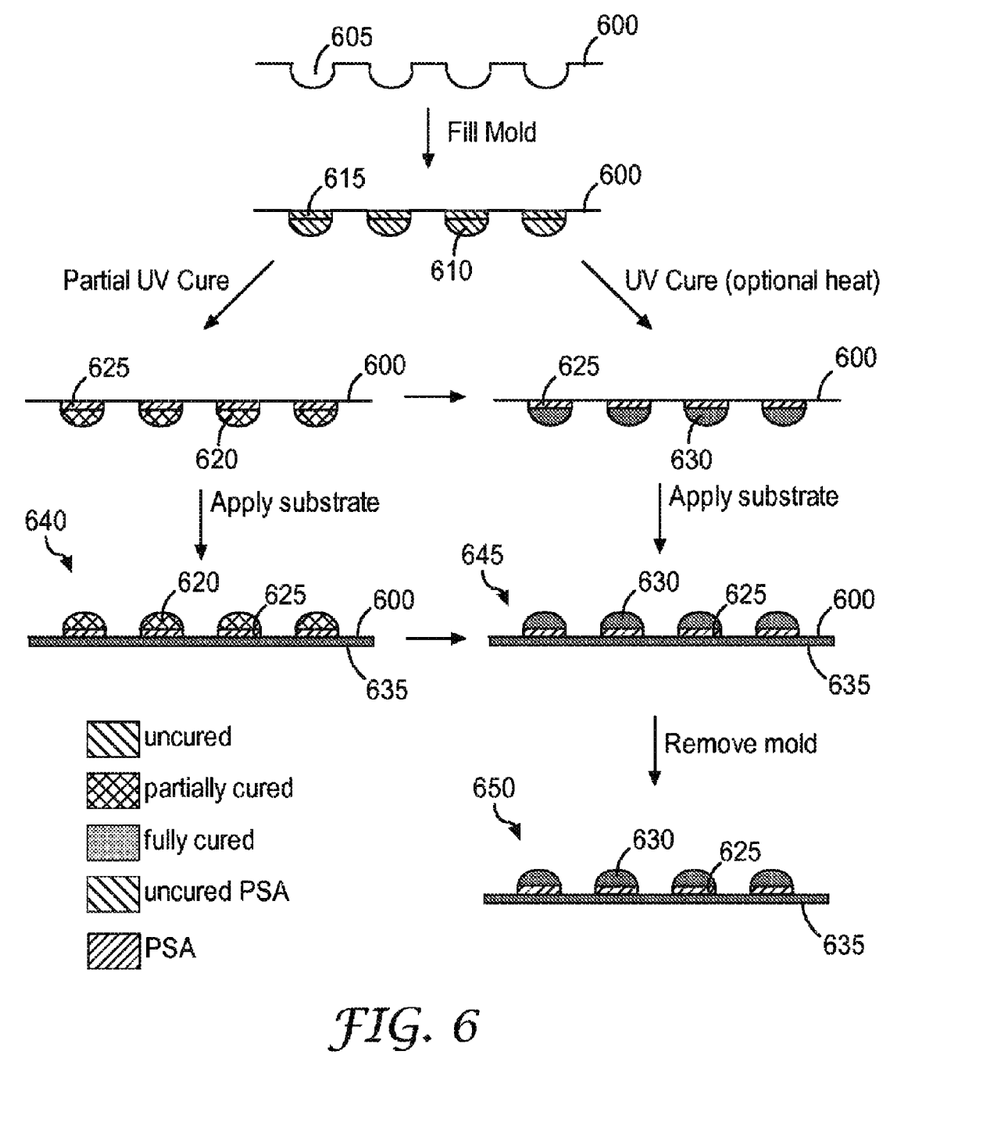
FIG. 6 is a schematic illustration of an exemplary method for making molded optical articles.

FIG. 6 illustrates an additional process flow diagram for the case where the mold may or may not be transparent to the actinic radiation needed to cure the lens resin material. This process describes a method to produce molded lenses with a PSA in a single step using a photocured PSA resin. Examples of photocurable silicone PSA resins include those described in U.S. Pat. No. 5,169,727 (Boardman et al.) as previously described.

To a mold 600 with cavities 605 is first added uncured silicon-containing lens resin 610 followed by uncured PSA resin 615. The lens resin and PSA resin in the mold are irradiated with actinic radiation to produce an at least partially cured lens resin 620 and PSA 625. The uncured lens resin can be converted to give a fully cured lens resin material 630 with the application of heat or by storage at room temperature. Substrate 635 can be applied after the PSA is cured to give assemblies 640 and 645. The mold can then be removed to give an assembly 650 comprising an array of lenses with PSA on a substrate. Other molds as described herein may also be used.

Additional types of optical article shapes that can be molded are described in US 2006/0092636 (Thompson et al.). The mold may be shaped so as to impart any useful structure on the surface of the optical article. For example, the mold may be shaped so as to form a refractive lens. Lensing refers to the uniform (or nearly uniform) curvature of a substantial portion of the surface of the article to form a positive or negative lens. The diameter of the lens may be, for example, approximately the size of a package or reflector cup used to make a light emitting diode (LED) device. In general, a lensed surface can be characterized by a "radius of curvature." The radius of curvature can be either positive denoting a convex surface, or negative denoting a concave surface, or infinite denoting a flat surface. Lensing can improve light extraction of LED devices by reducing the total internal reflections of light incident at the encapsulant-air interface. It can also change the angular distribution of light emitted from the LED device.

A surface of the optical article may also be shaped with macrostructures having a characteristic dimension that is smaller than an LED device package size, but much larger than the wavelength of visible light. That is, each macrostructure may have a dimension of from 10 µm to 1 mm. The spacing or period between each macrostructure may also be from 10 µm to 1 mm (or about ⅓ the size of the LED package). Examples of macrostructures include surfaces that, when viewed in cross-section, appear to be shaped like a sine wave, triangular wave, square wave, rectified sine wave, saw tooth wave, cycloid (more generally curtate cycloid), or rippled. The periodicity of the macrostructures may be one- or two-dimensional. Surfaces with one-dimensional periodicity have repeat structures along only one major direction of the surface. In one particular example, the mold may comprise any of the Vikuiti™ Brightness Enhancement Films available from 3M Company.

The mold may be shaped to impart a lens structure capable of generating a side-emission pattern for an LED device. For example, the optical article may have a central axis, and light entering it is reflected and refracted and eventually exits in a direction substantially perpendicular to the central axis; examples of these types of side emitting lens shapes and devices are described in U.S. Pat. Nos. 6,679,621 B2 and 6,598,998 B2. For another example, the optical article has a generally planar surface, with a smoothly curved surface defining a vortex shape that extends into the article and has the shape of an equiangular spiral that forms into a cusp; an example of such a profile is described in U.S. Pat. No. 6,473,554 B1, particularly FIGS. 15, 16 and 16A.

Surfaces with two-dimensional periodicity have repeat structures along any two orthogonal directions in the plane of the macrostructures. Examples of macrostructures with two-dimensional periodicity include random surfaces, two-dimensional sinusoids, arrays of cones, arrays of prisms such as cube-corners, and lenslet arrays. FIG. 4 of US 2007/0092636 (Thompson et al.) shows an elevated view of another exemplary surface shaped as a Fresnal lens having generally circular symmetry and that can be designed to replicate the optical properties of any positive or negative lens while occupying much less volume than a solid lens. Larger Fresnel lenses used for solar concentration in photovoltaic applications may have larger sturctured features, where the structures have sizes in the range of 0.1 mm up to approximately 5 mm or larger.

In general, the macrostructures do not need to be uniform in size across the surface. For example, they may get larger or smaller toward the edges of the package, or they may change shape. The surface may consist of any linear combination of shapes described herein.

Figure 7:
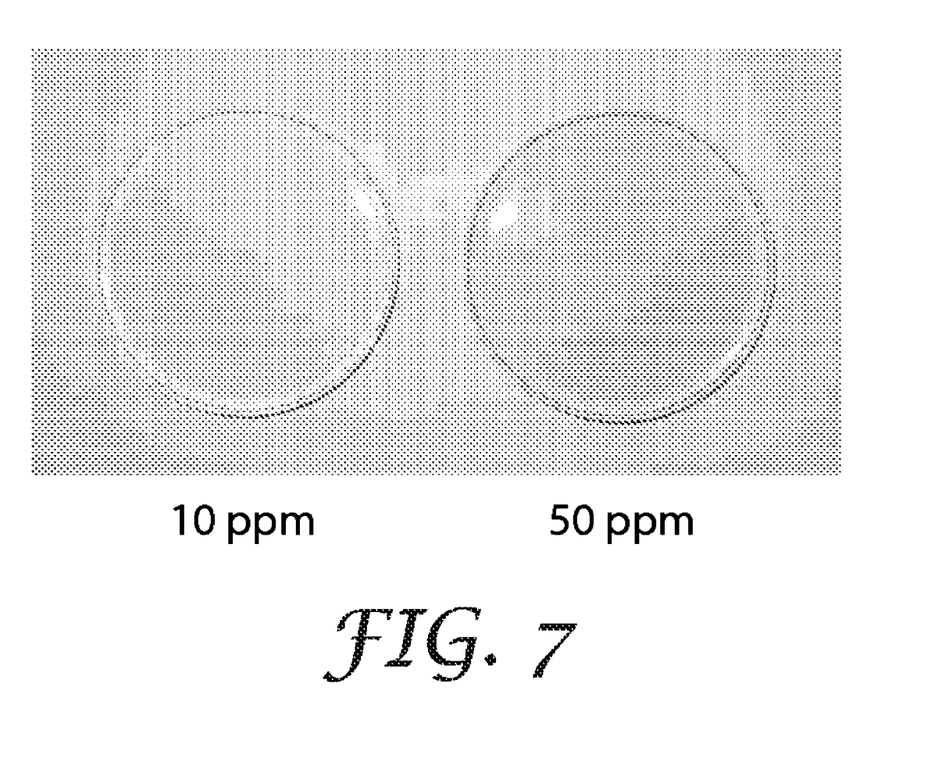
FIG. 7 is a photograph of exemplary and comparative silicone discs.

The surface may also be shaped with microstructures having a characteristic dimension on a scale similar to the wavelengths of visible light. That is, each microstructure may have a dimension of from 100 nm to less than 10 µm. Light tends to diffract when it interacts with microstructured surfaces. Thus, the design of microstructured surfaces requires careful attention to the wave-like nature of light. Examples of microstructures are one- and two-dimensional diffraction gratings; one-, two-, or three-dimensional photonic crystals; binary optical articles; and "motheye" anti-reflection coatings. Other examples of microstructures are shown in FIGS. 5-7 of US 2007/0092636 (Thompson et al.) and include linear prisms having one-dimensional periodicity, an array of two-dimensional prisms, and a surface molded with microlenses. The microstructures do not need to be uniform in size across the surface. For example, the articles may get larger or smaller toward the edges of the package, or they may change shape. The surface may consist of any linear combination of shapes described herein. FIG. 8 of US 2007/0092636 (Thompson et al.) shows an elevated view of another exemplary surface comprising randomly disposed protrusions and depressions.

The surface of the optical article may comprise structures from all three size scales. All package surfaces will be lensed with some radius of curvature, which could be positive, negative, or infinite. A macrostructure or microstructure could be added to the lensed surface to further enhance light output or to optimize the angular distribution for a given application. A surface could even incorporate a microstructure on a macrostructure on a lensed surface.

The photopolymerizable compositions utilized in the methods described herein include a silicon-containing resin comprising silicon-bonded hydrogen and aliphatic unsaturation. The silicon-containing resin can include monomers, oligomers, polymers, or mixtures thereof. It includes silicon-bonded hydrogen and aliphatic unsaturation, which allows for hydrosilylation (i.e., the addition of a silicon-bonded hydrogen across a carbon-carbon double bond or triple bond). The silicon-bonded hydrogen and the aliphatic unsaturation may or may not be present in the same molecule. Furthermore, the aliphatic unsaturation may or may not be directly bonded to silicon.

Preferred silicon-containing resins are those that provide an optical article, which can be in the form of an elastomer or a non-elastic solid, and are thermally and photochemically stable. For UV light, silicon-containing resins having refractive indices of at least 1.34 are preferred. For some embodiments, silicon-containing resins having refractive indices of at least 1.50 are preferred.

Preferred silicon-containing resins are selected such that they provide an optical article that is photostable and thermally stable. Herein, photostable refers to a material that does not chemically degrade upon prolonged exposure to actinic radiation, particularly with respect to the formation of colored or light absorbing degradation products. Herein, thermally stable refers to a material that does not chemically degrade upon prolonged exposure to heat, particularly with respect to the formation of colored or light absorbing degradation products. In addition, preferred silicon-containing resins are those that possess relatively rapid cure mechanisms (e.g., seconds to less than 30 minutes) in order to accelerate manufacturing times and reduce overall manufacturing cost.

Examples of suitable silicon-containing resins are disclosed, for example, in U.S. Pat. No. 6,376,569 (Oxman et al.), U.S. Pat. No. 4,916,169 (Boardman et al.), U.S. Pat. No. 6,046,250 (Boardman et al.), U.S. Pat. No. 5,145,886 (Oxman et al.), U.S. Pat. No. 6,150,546 (Butts), and in U.S. Pat. Appl. Nos. 2004/0116640 (Miyoshi). A preferred silicon-containing resin comprises an organosiloxane (i.e., silicones), which includes organopolysiloxanes. Such resins typically include at least two components, one having silicon-bonded hydrogen and one having aliphatic unsaturation. However, both silicon-bonded hydrogen and olefinic unsaturation may exist within the same molecule.

In one embodiment, the silicon-containing resin can include a silicone component having at least two sites of aliphatic unsaturation (e.g., alkenyl or alkynyl groups) bonded to silicon atoms in a molecule and an organohydrogensilane and/or organohydrogenpolysiloxane component having at least two hydrogen atoms bonded to silicon atoms in a molecule. Preferably, a silicon-containing resin includes both components, with the silicone containing aliphatic unsaturation as the base polymer (i.e., the major organosiloxane component in the composition.) Preferred silicon-containing resins are organopolysiloxanes. Such resins typically comprise at least two components, at least one of which contains aliphatic unsaturation and at least one of which contains silicon-bonded hydrogen. Such organopolysiloxanes are known in the art and are disclosed in such patents as U.S. Pat. No. 3,159,662 (Ashby), U.S. Pat. No. 3,220,972 (Lamoreaux), U.S. Pat. No. 3,410,886 (Joy), U.S. Pat. No. 4,609,574 (Keryk), U.S. Pat. No. 5,145,886 (Oxman, et. al), and U.S. Pat. No. 4,916,169 (Boardman et. al). Curable one component organopolysiloxane resins are possible if the single resin component contains both aliphatic unsaturation and silicon-bonded hydrogen.

Organopolysiloxanes that contain aliphatic unsaturation are preferably linear, cyclic, or branched organopolysiloxanes comprising units of the formula $R^1_a R^2_b SiO_{(4-a-b)/2}$ wherein: $R^1$ is a monovalent, straight-chained, branched or cyclic, unsubstituted or substituted hydrocarbon group that is free of aliphatic unsaturation and has from 1 to 18 carbon atoms; $R^2$ is a monovalent hydrocarbon group having aliphatic unsaturation and from 2 to 10 carbon atoms; a is 0, 1, 2, or 3; b is 0, 1, 2, or 3; and the sum a+b is 0, 1, 2, or 3; with the proviso that there is on average at least 1 $R^2$ present per molecule.

Organopolysiloxanes that contain aliphatic unsaturation preferably have an average viscosity of at least 5 mPa·s at 25° C.

Examples of suitable $R^1$ groups are alkyl groups such as methyl, ethyl, n-propyl, iso-propyl, n-butyl, iso-butyl, tert-butyl, n-pentyl, iso-pentyl, neo-pentyl, tert-pentyl, cyclopentyl, n-hexyl, cyclohexyl, n-octyl, 2,2,4-trimethylpentyl, n-decyl, n-dodecyl, and n-octadecyl; aromatic groups such as phenyl or naphthyl; alkaryl groups such as 4-tolyl; aralkyl groups such as benzyl, 1-phenylethyl, and 2-phenylethyl; and substituted alkyl groups such as 3,3,3-trifluoro-n-propyl, 1,1,2,2-tetrahydroperfluoro-n-hexyl, and 3-chloro-n-propyl.

Examples of suitable $R^2$ groups are alkenyl groups such as vinyl, 5-hexenyl, 1-propenyl, allyl, 3-butenyl, 4-pentenyl, 7-octenyl, and 9-decenyl; and alkynyl groups such as ethynyl, propargyl and 1-propynyl. In the present invention, groups having aliphatic carbon-carbon multiple bonds include groups having cycloaliphatic carbon-carbon multiple bonds.

Organopolysiloxanes that contain silicon-bonded hydrogen are preferably linear, cyclic or branched organopolysiloxanes comprising units of the formula $R^1{}_aH_cSiO_{(4-a-c)/2}$ wherein: $R^1$ is as defined above; a is 0, 1, 2, or 3; c is 0, 1, or 2; and the sum of a+c is 0, 1, 2, or 3; with the proviso that there is on average at least 1 silicon-bonded hydrogen atom present per molecule.

Organopolysiloxanes that contain silicon-bonded hydrogen preferably have an average viscosity of at least 5 mPa·s at 25° C.

Organopolysiloxanes that contain both aliphatic unsaturation and silicon-bonded hydrogen preferably comprise units of both formulae $R^1{}_aR^2{}_bSiO_{(4-a-b)/2}$ and $R^1{}_aH_cSiO_{(4-a-c)/2}$. In these formulae, $R^1$, $R^2$, a, b, and c are as defined above, with the proviso that there is an average of at least 1 group containing aliphatic unsaturation and 1 silicon-bonded hydrogen atom per molecule.

The molar ratio of silicon-bonded hydrogen atoms to aliphatic unsaturation in the silicon-containing resin (particularly the organopolysiloxane resin) may range from 0.5 to 10.0 mol/mol, preferably from 0.8 to 4.0 mol/mol, and more preferably from 1.0 to 3.0 mol/mol.

For some embodiments, organopolysiloxane resins described above wherein a significant fraction of the $R^1$ groups are phenyl or other aryl, aralkyl, or alkaryl are preferred, because the incorporation of these groups provides materials having higher refractive indices than materials wherein all of the $R^1$ radicals are, for example, methyl.

The disclosed compositions also include a metal-containing catalyst which enables the cure of the encapsulating material via radiation-activated hydrosilylation. These catalysts are known in the art and typically include complexes of precious metals such as platinum, rhodium, iridium, cobalt, nickel, and palladium. The precious metal-containing catalyst preferably contains platinum. Disclosed compositions can also include a cocatalyst, i.e., the use of two or more metal-containing catalysts.

A variety of such catalysts is disclosed, for example, in U.S. Pat. No. 6,376,569 (Oxman et al.), U.S. Pat. No. 4,916,169 (Boardman et al.), U.S. Pat. No. 6,046,250 (Boardman et al.), U.S. Pat. No. 5,145,886 (Oxman et al.), U.S. Pat. No. 6,150,546 (Butts), U.S. Pat. No. 4,530,879 (Drahnak), U.S. Pat. No. 4,510,094 (Drahnak) U.S. Pat. No. 5,496,961 (Dauth), U.S. Pat. No. 5,523,436 (Dauth), U.S. Pat. No. 4,670,531 (Eckberg), as well as International Publication No. WO 95/025735 (Mignani).

Certain preferred platinum-containing catalysts are selected from the group consisting of Pt(II) β-diketonate complexes (such as those disclosed in U.S. Pat. No. 5,145,886 (Oxman et al.), ($\eta^5$-cyclopentadienyl)tri(σ-aliphatic) platinum complexes (such as those disclosed in U.S. Pat. No. 4,916,169 (Boardman et al.) and U.S. Pat. No. 4,510,094 (Drahnak)), and $C_{7-20}$-aromatic substituted ($\eta^5$-cyclopentadienyl)tri(σ-aliphatic)platinum complexes (such as those disclosed in U.S. Pat. No. 6,150,546 (Butts). The amount of catalyst used is discussed below.

In addition to the silicon-containing resins and catalysts, the photopolymerizable composition can also include non-absorbing metal oxide particles, semiconductor particles, phosphors, sensitizers, photoinitiators, antioxidants, catalyst inhibitors, and pigments. If used, such additives are used in amounts to produced the desired effect. These additives are further described in U.S. Pat. No. 7,192,795 B1 (Boardman et al.)

The disclosed method involves the use of actinic radiation having a wavelength of less than or equal to 700 nanometers (nm). Thus, the disclosed methods are particularly advantageous to the extent they avoid harmful temperatures. Preferably, the disclosed methods involve the application of actinic radiation at a temperature of less than 120° C., more preferably, at a temperature of less than 60° C., and still more preferably at a temperature of 25° C. or less.

Actinic radiation used in the disclosed methods includes light of a wide range of wavelengths less than or equal to 700 nm, including visible and UV light, but preferably, the actinic radiation has a wavelength of of 600 nm or less, and more preferably from 200 to 600 nm., and even more preferably, from 250 to 500 nm. Preferably, the actinic radiation has a wavelength of at least 200 nm, and more preferably at least 250 nm. Examples of sources of actinic radiation include tungsten halogen lamps, xenon arc lamps, mercury arc lamps, incandescent lamps, germicidal lamps, and fluorescent lamps.

In the references cited herein, the amount of metal-containing catalyst used in a given photopolymerizable composition is said to depend on a variety of factors such as the radiation source, whether or not heat is used, amount of time, temperature, etc., as well as on the particular chemistry of the silicon-containing resin(s), its reactivity, the amount present in the photopolymerizable composition, etc. In particular, it is pointed out that in some embodiments, the metal-containing catalyst may be used in an amount of at least 1 part per million (ppm) of the photopolymerizable composition. Further, it is said that the catalysts are included in amounts of no greater than 1000 parts of metal per one million parts of the photopolymerizable composition.

FIG. 7 is a photograph showing side-by-side comparision of two discs made from photopolymerizable compositions comprising silicon-containing resins. Hydrosilylation of components was carried out in the presence of 10 and 50 ppm, respectively, of a platinum catalyst. Details of the experimental procedures can be found in Example 1 and Comparative Example 1 for 10 and 50 ppm, respectively.

Such catalysts are used in an amount effective to accelerate the hydrosilylation reaction. In one embodiment, the photopolymerizable composition comprises a platinum catalyst providing from 0.5 to 30 ppm platinum per one million parts of the photopolymerizable composition. In another embodiment, the photopolymerizable composition comprises a platinum catalyst providing 0.5 to 20 ppm platinum per one million parts of the photopolymerizable composition. In another embodiment, the photopolymerizable composition comprises a platinum catalyst providing 0.5 to 12 ppm platinum per one million parts of the photopolymerizable composition.

In one embodiment, the photopolymerizable composition is free of catalyst inhibitor. Minimization of the amounts of materials that can act as catalyst inhibitors can be desirable to maximize the cure speed of the photopolymerizable composition in that active hydrosilylation catalyst generated upon irradiation of the composition is produced in the absence of materials that can attenuate the activity of said active catalyst.

EXAMPLES

Experimental

An organosiloxane, silicone master batch, having aliphatic unsaturation and silicon-bonded hydrogen, was prepared by adding 500.0 g of Gelest VQM-135 (Gelest, Inc., Morrisville, Pa.) and 25.0 g of Dow Corning Syl-Off 7678 (Dow Corning, Midland, Mich.) to a 1 liter glass bottle. A stock catalyst solution was prepared by dissolving 33 mg of MeCpPtMe$_3$ (Alfa Aesar, Ward Hill, Mass.) in 1 mL of toluene. Silicone compositions having different amounts of the platinum catalyst were prepared by combining master batch and catalyst solution as follows. All compositions were prepared under safe conditions where light below a wavelength of 500 nm was excluded.

Example 1

To a 100 mL amber jar was added 40.0 g of the silicone master batch and 20 µL of the catalyst solution (equivalent to 10 ppm platinum catalyst). The solution was mixed thoroughly with a metal spatula and was allowed to degas over several hours. Once the composition was degassed 6.2 g of the solution was poured into a plastic Petri dish having a diameter of 55 mm. The silicone solution was allowed to settle and was then cured by irradiation for 15 minutes under a UVP Blak-Ray Lamp Model XX-15L fitted with two 16 inch Philips TUV 15 W/G15 T8 Germicidal bulbs emitting primarily at 254 nm, followed by heating for 30 minutes at 80° C. in a forced air oven. The material cures to a tack-free solid in 1 to 2 minutes. The cured silicone disc was removed from the plastic Petri dish and was 2.7 mm in thickness at the center of the silicone disc. A transmission spectrum of the silicone was taken using a PerkinElmer Lambda 900 UV/VIS Spectrophotometer (PerkinElmer Instruments, Norwalk, Conn.). The transmission of the sample at 400 nm, not corrected for Fresnel reflections, was 93.8%. The sample was placed into a glass Petri dish to protect the surface from contamination by dust and debris and the sample was aged at 130° C. in a forced air oven for 1000 hours. Transmission data for the sample at 400 nm measured during the 1000 hour aging experiment are shown in Table 1. Transmission data for the sample at 460 nm measured during the 1000 hour aging experiment are shown in Table 3. Transmission data for the sample at 530 nm measured during the 1000 hour aging experiment are shown in Table 5. Transmission data for the sample at 670 nm measured during the 1000 hour aging experiment are shown in Table 7.

Example 2

To a 100 mL amber jar was added 40.0 g of the silicone master batch and 30 µL of the catalyst solution (equivalent to 15 ppm platinum catalyst). The solution was mixed thoroughly with a metal spatula and was allowed to degas over several hours. Once the composition was degassed 6.2 g of the solution was poured into a plastic Petri dish having a diameter of 55 mm. The silicone solution was allowed to settle and was then cured by irradiation for 15 minutes under a UVP Blak-Ray Lamp Model XX-15L fitted with two 16 inch Philips TUV 15 W/G15 T8 Germicidal bulbs emitting primarily at 254 nm, followed by heating for 30 minutes at 80° C. in a forced air oven. The cured silicone disc was removed from the plastic Petri dish and was 2.7 mm in thickness at the center of the silicone disc. A transmission spectrum of the silicone was taken using a PerkinElmer Lambda 900 UV/VIS Spectrophotometer (PerkinElmer Instruments, Norwalk, Conn.). The transmission of the sample at 400 nm, not corrected for Fresnel reflections, was 93.2%. The sample was placed into a glass Petri dish to protect the surface from contamination by dust and debris and the sample was aged at 130° C. in a forced air oven for 1000 hours. Transmission data for the sample at 400 nm measured during the 1000 hour aging experiment are shown in Table 1. Transmission data for the sample at 460 nm measured during the 1000 hour aging experiment are shown in Table 3. Transmission data for the sample at 530 nm measured during the 1000 hour aging experiment are shown in Table 5. Transmission data for the sample at 670 nm measured during the 1000 hour aging experiment are shown in Table 7.

Example 3

To a 100 mL amber jar was added 40.0 g of the silicone master batch and 40 µL of the catalyst solution (equivalent to 20 ppm platinum catalyst). The solution was mixed thoroughly with a metal spatula and was allowed to degas over several hours. Once the composition was degassed 6.2 g of the solution was poured into a plastic Petri dish having a diameter of 55 mm. The silicone solution was allowed to settle and was then cured by irradiation for 15 minutes under a UVP Blak-Ray Lamp Model XX-15L fitted with two 16 inch Philips TUV 15 W/G15 T8 Germicidal bulbs emitting primarily at 254 nm, followed by heating for 30 minutes at 80° C. in a forced air oven. The cured silicone disc was removed from the plastic Petri dish and was 2.7 mm in thickness at the center of the silicone disc. A transmission spectrum of the silicone was taken using a PerkinElmer Lambda 900 UV/VIS Spectrophotometer (PerkinElmer Instruments, Norwalk, Conn.). The transmission of the sample at 400 nm, not corrected for Fresnel reflections, was 92.6%. The sample was placed into a glass Petri dish to protect the surface from contamination by dust and debris and the sample was aged at 130° C. in a forced air oven for 1000 hours. Transmission data for the sample at 400 nm measured during the 1000 hour aging experiment are shown in Table 1. Transmission data for the sample at 460 nm measured during the 1000 hour aging experiment are shown in Table 3. Transmission data for the sample at 530 nm measured during the 1000 hour aging experiment are shown in Table 5. Transmission data for the sample at 670 nm measured during the 1000 hour aging experiment are shown in Table 7.

Example 4

To a 100 mL amber jar was added 20.0 g of the silicone master batch and 25 µL of the catalyst solution (equivalent to 25 ppm platinum catalyst). The solution was mixed thoroughly with a metal spatula and was allowed to degas over several hours. Once the composition was degassed 6.2 g of the solution was poured into a plastic Petri dish having a diameter of 55 mm. The silicone solution was allowed to settle and was then cured by irradiation for 15 minutes under a UVP Blak-Ray Lamp Model XX-15L fitted with two 16 inch Philips TUV 15 W/G15 T8 Germicidal bulbs emitting primarily at 254 nm, followed by heating for 30 minutes at 80° C. in a forced air oven. The cured silicone disc was removed from the plastic Petri dish and was 2.7 mm in thickness at the center of the silicone disc. A transmission spectrum of the silicone was taken using a PerkinElmer Lambda 900 UV/VIS Spectrophotometer (PerkinElmer Instruments, Norwalk, Conn.). The transmission of the sample at 400 nm, not corrected for Fresnel reflections, was 92.3%. The sample was placed into a glass Petri dish to protect the surface from contamination by dust and debris and the sample was aged at 130° C. in a forced air oven for 1000 hours. Transmission data for the sample at 400 nm measured during the 1000 hour aging experiment are shown in Table 1. Transmission data for the sample at 460 nm measured during the 1000 hour aging experiment are shown in Table 3. Transmission data for the sample at 530 nm measured during the 1000 hour aging experiment are shown in Table 5. Transmission data for the sample at 670 nm measured during the 1000 hour aging experiment are shown in Table 7. By extrapolation of the results from Examples 1-4, the composition containing 30 ppm platinum would be expected to have a percent transmission at 400 nm, after 1000 hours at 130° C., of at least about 85%.

Comparative Example 1

To a 100 mL amber jar was added 20.0 g of the silicone master batch and 50 µL of the catalyst solution (equivalent to 50 ppm platinum catalyst). The solution was mixed thoroughly with a metal spatula and was allowed to degas over several hours. Once the composition was degassed 6.2 g of the solution was poured into a plastic Petri dish having a diameter of 55 mm. The silicone solution was allowed to settle and was then cured by irradiation for 15 minutes under a UVP Blak-Ray Lamp Model XX-15L fitted with two 16 inch Philips TUV 15 W/G15 T8 Germicidal bulbs emitting primarily at 254 nm, followed by heating for 30 minutes at 80° C. in a forced air oven. The material cures to a tack-free solid in about 1 minute. The cured silicone disc was removed from the plastic Petri dish and was 2.7 mm in thickness at the center of the silicone disc. A transmission spectrum of the silicone was taken using a PerkinElmer Lambda 900 UV/VIS Spectrophotometer (PerkinElmer Instruments, Norwalk, Conn.). The transmission of the sample at 400 nm, not corrected for Fresnel reflections, was 88.9%. The sample was placed into a glass Petri dish to protect the surface from contamination by dust and debris and the sample was aged at 130° C. in a forced air oven for 1000 hours. Transmission data for the sample at 400 nm measured during the 1000 hour aging experiment are shown in Table 2. Transmission data for the sample at 460 nm measured during the 1000 hour aging experiment are shown in Table 4. Transmission data for the sample at 530 nm measured during the 1000 hour aging experiment are shown in Table 6. Transmission data for the sample at 670 nm measured during the 1000 hour aging experiment are shown in Table 8.

Comparative Example 2

To a 100 mL amber jar was added 20.0 g of the silicone master batch and 100 µL of the catalyst solution (equivalent to 100 ppm platinum catalyst). The solution was mixed thoroughly with a metal spatula and was allowed to degas over several hours. Once the composition was degassed 6.2 g of the solution was poured into a plastic Petri dish having a diameter of 55 mm. The silicone solution was allowed to settle and was then cured by irradiation for 15 minutes under a UVP Blak-Ray Lamp Model XX-15L fitted with two 16 inch Philips TUV 15 W/G15 T8 Germicidal bulbs emitting primarily at 254 nm, followed by heating for 30 minutes at 80° C. in a forced air oven. The cured silicone disc was removed from the plastic Petri dish and was 2.7 mm in thickness at the center of the silicone disc. A transmission spectrum of the silicone was taken using a PerkinElmer Lambda 900 UV/VIS Spectrophotometer (PerkinElmer Instruments, Norwalk, Conn.). The transmission of the sample at 400 nm, not corrected for Fresnel reflections, was 84.6%. The sample was placed into a glass Petri dish to protect the surface from contamination by dust and debris and the sample was aged at 130° C. in a forced air oven for 1000 hours. Transmission data for the sample at 400 nm measured during the 1000 hour aging experiment are shown in Table 2. Transmission data for the sample at 460 nm measured during the 1000 hour aging experiment are shown in Table 4. Transmission data for the sample at 530 nm measured during the 1000 hour aging experiment are shown in Table 6. Transmission data for the sample at 670 nm measured during the 1000 hour aging experiment are shown in Table 8.

Comparative Example 3

To a 100 mL amber jar was added 20.0 g of the silicone master batch and 200 µL of the catalyst solution (equivalent to 200 ppm platinum catalyst). The solution was mixed thoroughly with a metal spatula and was allowed to degas over several hours. Once the composition was degassed 6.2 g of the solution was poured into a plastic Petri dish having a diameter of 55 mm. The silicone solution was allowed to settle and was then cured by irradiation for 15 minutes under a UVP Blak-Ray Lamp Model XX-15L fitted with two 16 inch Philips TUV 15 W/G15 T8 Germicidal bulbs emitting primarily at 254 nm, followed by heating for 30 minutes at 80° C. in a forced air oven. The cured silicone disc was removed from the plastic Petri dish and was 2.7 mm in thickness at the center of the silicone disc. A transmission spectrum of the silicone was taken using a PerkinElmer Lambda 900 UV/VIS Spectrophotometer (PerkinElmer Instruments, Norwalk, Conn.). The transmission of the sample at 400 nm, not corrected for Fresnel reflections, was 79.4%. The sample was placed into a glass Petri dish to protect the surface from contamination by dust and debris and the sample was aged at 130° C. in a forced air oven for 1000 hours. Transmission data for the sample at 400 nm measured during the 1000 hour aging experiment are shown in Table 2. Transmission data for the sample at 460 nm measured during the 1000 hour aging experiment are shown in Table 4. Transmission data for the sample at 530 nm measured during the 1000 hour aging experiment are shown in Table 6. Transmission data for the sample at 670 nm measured during the 1000 hour aging experiment are shown in Table 8.

TABLE 1

| 130° C. | % Transmission at 400 nm (%) | | | |
|---|---|---|---|---|
| Aging time (hours) | Example 1 (10 ppm cat.) | Example 2 (15 ppm cat.) | Example 3 (20 ppm cat.) | Example 4 (25 ppm cat.) |
| 0 | 93.8 | 93.2 | 92.6 | 92.3 |
| 23 | 92.8 | 92.6 | 91.5 | 90.4 |
| 40 | 91.8 | 91.8 | 90.7 | 89.9 |
| 71 | 92.0 | 91.6 | 90.3 | 89.5 |
| 158 | 91.4 | 91.1 | 89.6 | 88.6 |
| 250 | 91.6 | 90.8 | 89.5 | 87.8 |
| 500 | 91.2 | 90.3 | 88.7 | 87.5 |
| 775 | 90.5 | 89.7 | 88.5 | 87.2 |
| 1000 | 90.4 | 89.8 | 88.4 | 87.2 |

TABLE 2

130° C. Aging — % Transmission at 400 nm

| time (hours) | Comparative Ex. 1 (50 ppm cat.) | Comparative Ex. 2 (100 ppm cat.) | Comparative Ex. 3 (200 ppm cat.) |
|---|---|---|---|
| 0 | 88.9 | 84.6 | 79.4 |
| 23 | 84.6 | 75.1 | 56.5 |
| 40 | 84.1 | 74.8 | 56.4 |
| 71 | 82.6 | 72.4 | 54.7 |
| 158 | 81.7 | 71.3 | 53.4 |
| 250 | 81.3 | 71.1 | 53.7 |
| 500 | 81.2 | 71.0 | 52.9 |
| 775 | 81.0 | 70.5 | 52.2 |
| 1000 | 80.7 | 70.0 | 53.0 |

TABLE 3

130° C. — % Transmission at 460 nm

| Aging time (hours) | Example 1 (10 ppm cat.) | Example 2 (15 ppm cat.) | Example 3 (20 ppm cat.) | Example 4 (25 ppm cat.) |
|---|---|---|---|---|
| 0 | 94.4 | 94.3 | 94.3 | 94.3 |
| 23 | 93.3 | 93.7 | 92.9 | 91.9 |
| 40 | 92.7 | 92.9 | 92.1 | 91.6 |
| 71 | 92.6 | 92.6 | 91.8 | 91.3 |
| 158 | 92.3 | 92.5 | 91.3 | 90.7 |
| 250 | 92.5 | 92.0 | 91.1 | 89.8 |
| 500 | 92.3 | 91.5 | 90.5 | 89.6 |
| 775 | 91.6 | 91.3 | 90.2 | 89.4 |
| 1000 | 91.5 | 91.4 | 90.3 | 89.3 |

TABLE 4

130° C. Aging — % Transmission at 460 nm

| time (hours) | Comparative Ex. 1 (50 ppm cat.) | Comparative Ex. 2 (100 ppm cat.) | Comparative Ex. 3 (200 ppm cat.) |
|---|---|---|---|
| 0 | 93.6 | 92.4 | 91.0 |
| 23 | 87.9 | 81.0 | 66.7 |
| 40 | 87.0 | 79.9 | 65.3 |
| 71 | 86.1 | 78.3 | 64.5 |
| 158 | 85.4 | 77.4 | 63.0 |
| 250 | 84.9 | 77.1 | 63.0 |
| 500 | 84.8 | 77.0 | 62.1 |
| 775 | 84.7 | 76.5 | 61.4 |
| 1000 | 84.5 | 76.1 | 62.1 |

TABLE 5

130° C. — % Transmission at 530 nm

| Aging time (hours) | Example 1 (10 ppm cat.) | Example 2 (15 ppm cat.) | Example 3 (20 ppm cat.) | Example 4 (25 ppm cat.) |
|---|---|---|---|---|
| 0 | 94.5 | 94.6 | 94.6 | 94.6 |
| 23 | 93.6 | 94.1 | 93.4 | 92.9 |
| 40 | 93.0 | 93.4 | 92.9 | 92.5 |
| 71 | 93.1 | 93.2 | 92.6 | 92.3 |
| 158 | 92.7 | 93.3 | 92.3 | 91.8 |
| 250 | 93.1 | 92.9 | 92.2 | 91.3 |
| 500 | 92.8 | 92.5 | 91.6 | 91.0 |
| 775 | 92.4 | 92.4 | 91.7 | 91.0 |
| 1000 | 92.2 | 92.4 | 91.6 | 90.8 |

TABLE 6

130° C. Aging — % Transmission at 530 nm

| time (hours) | Comparative Ex. 1 (50 ppm cat.) | Comparative Ex. 2 (100 ppm cat.) | Comparative Ex. 3 (200 ppm cat.) |
|---|---|---|---|
| 0 | 94.4 | 94.2 | 93.9 |
| 23 | 89.9 | 85.1 | 74.5 |
| 40 | 89.1 | 84.1 | 73.0 |
| 71 | 88.5 | 82.8 | 72.2 |
| 158 | 87.9 | 82.0 | 70.7 |
| 250 | 87.4 | 81.7 | 70.7 |
| 500 | 87.4 | 81.6 | 69.8 |
| 775 | 87.5 | 81.2 | 69.2 |
| 1000 | 87.2 | 80.8 | 69.8 |

TABLE 7

130° C. — % Transmission at 670 nm

| Aging time (hours) | Example 1 (10 ppm cat.) | Example 2 (15 ppm cat.) | Example 3 (20 ppm cat.) | Example 4 (25 ppm cat.) |
|---|---|---|---|---|
| 0 | 94.5 | 94.5 | 94.5 | 94.6 |
| 23 | 93.6 | 94.2 | 93.9 | 93.5 |
| 40 | 93.2 | 93.8 | 93.6 | 93.4 |
| 71 | 93.6 | 93.8 | 93.6 | 93.5 |
| 158 | 93.3 | 93.9 | 93.3 | 93.0 |
| 250 | 93.4 | 93.7 | 93.2 | 92.7 |
| 500 | 93.3 | 93.3 | 92.8 | 92.5 |
| 775 | 92.7 | 93.1 | 92.8 | 92.5 |
| 1000 | 92.6 | 93.2 | 92.7 | 92.4 |

TABLE 8

130° C. Aging — % Transmission at 670 nm

| time (hours) | Comparative Ex. 1 (50 ppm cat.) | Comparative Ex. 2 (100 ppm cat.) | Comparative Ex. 3 (200 ppm cat.) |
|---|---|---|---|
| 0 | 94.4 | 94.4 | 94.4 |
| 23 | 92.2 | 89.7 | 83.9 |
| 40 | 91.7 | 89.1 | 82.8 |
| 71 | 91.5 | 88.3 | 82.3 |
| 158 | 91.0 | 87.7 | 81.0 |
| 250 | 90.5 | 87.3 | 80.8 |
| 500 | 90.7 | 87.3 | 80.3 |
| 775 | 90.7 | 87.0 | 79.8 |
| 1000 | 90.5 | 86.8 | 80.2 |

Various modifications and alterations to the invention will become apparent to those skilled in the art without departing from the scope and spirit of the invention.

What is claimed is:

1. An optical article comprising:
   a positive or negative lens comprising a photopolymerized composition, wherein the photopolymerized composition prior to photopolymerization comprises a photopolymerizable composition, the photopolymerizable composition comprising: a silicon-containing resin comprising silicon-bonded hydrogen and aliphatic unsaturation, and a platinum catalyst activated by actinic radiation providing from about 10 to about 30 parts per million of platinum; and
   a substrate disposed on a planar surface of the positive or negative lens, wherein the substrate comprises a silicone-based pressure sensitive adhesive.

2. The optical article of claim 1, wherein the photopolymerizable composition is free of catalyst inhibitor.

3. The optical article of claim 1, wherein the the silicone-containing resin comprises a first organosiloxane having the silicon-bonded hydrogen and a second organosiloxane having the aliphatic unsaturation.

4. The optical article of claim 3, wherein the first organosiloxane is an organosiloxane having units of the formula:

wherein:
R$^1$ is a monovalent, straight-chained, branched or cyclic, unsubstituted or substituted, hydrocarbon group that is free of aliphatic unsaturation and has from 1 to 18 carbon atoms;
a is 0, 1, 2, or 3;
c is 0, 1, or 2; and
the sum of a+c is 0, 1, 2, or 3;
with the proviso that there is on average at least one silicon-bonded hydrogen present per molecule.

5. The optical article of claim 3, wherein the second organosiloxane is an organosiloxane having units of the formula:

wherein:
R$^1$ is a monovalent, straight-chained, branched or cyclic, unsubstituted or substituted, hydrocarbon group that is free of aliphatic unsaturation and has from 1 to 18 carbon atoms;
R$^2$ is a monovalent hydrocarbon group having aliphatic unsaturation and from 2 to 10 carbon atoms;
a is 0, 1, 2, or 3;
b is 0, 1, 2, or 3; and
the sum a+b is 0, 1, 2, or 3;
with the proviso that there is on average at least one R$^2$ present per molecule.

6. The optical article of claim 1, wherein the positive or negative lens is a Fresnel lens.

7. An optical article comprising:
a positive or negative lens comprising a photopolymerized composition, wherein the photopolymerized composition prior to photopolymerization comprises: a silicon-containing resin comprising silicon-bonded hydrogen and aliphatic unsaturation, and a platinum catalyst activated by actinic radiation providing from about 10 to about 30 parts per million of platinum; and
a substrate disposed on a planar surface of the positive or negative lens, wherein the substrate is a pressure sensitive adhesive.

8. The optical article of claim 7, wherein the pressure sensitive adhesive is formed from free-radically polymerizable monomers selected from the group of (meth)acrylates, vinyl monomers, and mixtures thereof.

9. The optical article of claim 7, wherein the pressure sensitive adhesive is formed from a (meth)acrylate block copolymer comprising:
at least two A block polymeric units that are the reaction product of a first monomer composition comprising an alkyl methacrylate, an aralkyl methacrylate, an aryl methacrylate, or a combination thereof, each A block having a Tg of at least 50° C., the methacrylate block copolymer comprising from 20 to 50 weight percent A block; and
at least one B block polymeric unit that is the reaction product of a second monomer composition comprising an alkyl (meth)acrylate, a heteroalkyl (meth)acrylate, a vinyl ester, or a combination thereof, the B block having a Tg no greater than 20° C., the (meth)acrylate block copolymer comprising from 50 to 80 weight percent B block;
wherein the A block polymeric units are present as nanodomains having an average size less than about 150 nm in a matrix of the B block polymeric units.

10. An optical article comprising:
a positive or negative lens comprising a photopolymerizable composition, wherein the photopolymerizable composition comprises: a silicon-containing resin comprising silicon-bonded hydrogen and aliphatic unsaturation, and a platinum catalyst activated by actinic radiation providing from about 10 to about 30 parts per million of platinum; and
a molded curable pressure sensitive adhesive-forming composition disposed on a planar surface of the positive or negative lens.

* * * * *